United States Patent Office 3,375,085
Patented Mar. 26, 1968

3,375,085
(DIFLUOROAMINO)SULFUR PENTAFLUORIDE
Anestis L. Logothetis, Wilmington, Del., assignor to E. I. du Pont de Nemours and Company, Wilmington, Del., a corporation of Delaware
No Drawing. Filed Aug. 10, 1961, Ser. No. 130,492
1 Claim. (Cl. 23—357)

ABSTRACT OF THE DISCLOSURE

Claimed is the compound $SF_5NF_2$ useful as a polymerization initiator.

SUMMARY AND DETAILS OF THE INVENTION

This application relates to, and has as its object provision of the novel and useful compound (difluoroamino)sulfur pentafluoride, $SF_5NF_2$.

The compounds of this invention may be obtained by reacting dinitrogen tetrafluoride ($N_2F_4$) with selected coreactants under the influence of a source of chemical activating energy. This source is ultraviolet light or heat, the former when the coreactant with $N_2F_4$ is $SF_4$ or $SF_5Cl$ and the latter when the coreactant is sulfur.

When ultraviolet light is used as the source of chemically activating energy, a gaseous mixture of $N_2F_4$ and $SF_4$ or $SF_5Cl$ is passed through a zone illuminated with ultraviolet light, e.g., a mercury vapor lamp, and the condensible products are isolated in traps cooled in a bath containing an acetone-solid carbon dioxide mixture. The irradiation is carried out in the vapor phase at a temperature in the range of $-40°$ to $+40°$ C. for periods of time which can be as short as 10 minutes or as long as several days, depending upon the size of the sample being irradiated and the efficiency of the light source.

As used herein, ultraviolet light refers to electromagnetic radiation of a wave length in the range of 2000 to 3000 A. As a source of ultraviolet light, there can be used any of the commercially available lamps which are high in ultraviolet light output. Generally speaking, mercury vapor lamps are preferred because they provide a relatively intense source of ultraviolet light. Many lamps of this type are available and include low and high pressure lamps with various types of envelopes. The most preferred types are those with quartz envelopes because such envelopes permit higher transmission of ultraviolet light.

In general, it is desirable that the light source be as close to the mixture of $N_2F_4$ and $SF_4$ or $SF_5Cl$ as possible. Proper spacing can be accomplished by placing the lamp adjacent to a transparent wall of the reaction vessel or in a suitable well projecting into the reaction space, or by passing the mixture of $N_2F_4$ and $SF_4$ or $SF_5Cl$ through a tube which is exposed to ultraviolet light.

In the aspect of the invention employing heat, sulfur and $N_2F_4$ are contacted at a temperature in excess of 100° C., usually at a temperature of 125° to 145° C., under autogenous pressure. If desired the reaction can be carried out under externally applied pressures. Pressurization, however, offers no practical advantage from the standpoint of yield of desired product and rather complicates equipment design.

Because $N_2F_4$ reacts slowly with silica glasses, it is desirable to carry out the thermal activation reaction in vessels which are made of nickel or copper or alloys of these metals. In the case of the ultraviolet light-activated reaction it is not necessary, but is preferable, to effect the reaction in vessels fitted with a calcium fluoride window.

EMBODIMENTS OF THE INVENTION

There follow some examples which illustrate but do not limit this invention. In these examples, all pressures are autogenous unless otherwise indicated. Chromatographic analyses were carried out on a 12' x 0.25" column packed with a diatomaceous earth treated with the ethyl ester the perhalooctanoic acid so as to deposit 20% by weight of the ester on the support. The column was held at 0° C. and helium was employed as a carrier gas at a flow rate of 60 cc./min., measured at the outlet.

Example I

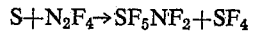

$$S + N_2F_4 \rightarrow SF_5NF_2 + SF_4$$

A stainless steel shaker tube containing 3.2 g. (0.1 mole) of sulfur was charged with 10.4 g. (0.1 mole) of $N_2F_4$ and the charge was then heated at 140° C. for one hour, at 120° C. for one hour, at 130° C. for one hour, and at 145° C. for three hours at autogenous pressure. The reactor was then allowed to cool to room temperature and the gaseous products condensed in a cylinder cooled in a liquid nitrogen bath. A mass spectroscopic analysis of the gaseous products of reaction indicated the presence of the following compounds: $SF_4$ (48.0%), $N_2F_4$ (30.1%), $SOF_2$ (5.9%), $N_2O$, $CO_2$ (1.3%), $SF_5NF_2$ (5.7%). A pure sample of (difluoroamino)sulfur pentafluoride, $SF_5NF_2$ was obtained by gas chromatography (retention time 3.7 minutes) and identified by mass spectroscopy. Some of the main peaks are given below:

TABLE I

| M/e [1] | Pattern, percent [2] | Ion |
|---|---|---|
| 160 | 0.5 | $SF_5NF^+$ or $SF_4NF_2^+$ |
| 141 | 0.2 | $SF_5NF^+$ |
| 127 | 100 | $SF_5^+$ |
| 108 | 19.5 | $SF_4^+$ |
| 89 | 93.5 | $SF_3^+$ |
| 70 | 11.2 | $SF_2^+$ |
| 52 | 18.8 | $NF_2^+$ |
| 51 | 6.2 | $SF^+$ |
| 33 | 6.2 | $NF^+$ |

[1] Mass/charge ratio.
[2] Relative intensities with respect to most abundant, 100%, m/e, 127.

An infrared spectrum showed absorption at $10.58\mu$, $10.95\mu$, and $11.30\mu$ (doublet).

Although in the above example heating was stepwise, this is not necessary and the charge can be heated to temperature in one sep, if suitable means for obtaining even heat-distribution are provided.

Example II

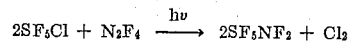

$$2SF_5Cl + N_2F_4 \xrightarrow{h\nu} 2SF_5NF_2 + Cl_2$$

In an evacuated 500 cc. quartz tube were placed $SF_5Cl$ (250 mm. of mercury pressure, 1.8 g., 0.011 mole) and $N_2F_4$ (250 mm. of mercury pressure, 1.15 g., 0.011 mole), and the gaseous mixture was irradiated with a low pressure, spiral mercury resonance lamp for 20 hours, at room temperature (25°–30° C.). The products were condensed in a cylinder cooled in a liquid nitrogen bath, and analyzed by gas chromatography. The (difluoroamino) sulfur pentafluoride (in 50% yield) was identified by its retention time (3.7 minutes). It is a colorless gas, B.P. $-17.5°$ C., which is stable at room temperature when stored in closed containers.

Example III

In a 12-liter nickel tank equipped with a $CaF_2$ window were placed $SF_5Cl$ (320 mm. of mercury pressure, 35.0 g., 0.216 mole) and $N_2F_4$ (240 mm. of mercury pressure, 14.0 g., 0.135 mole). The resultant mixture was irradiated with a low pressure mercury resonance lamp for 120 hours at room temperature (25° C.). The gaseous products were condensed in a cylinder cooled in a liquid nitrogen bath (47.0 g. of condensate) and scrubbed with a 10% sodium hydroxide solution. A distillation of the scrubbed product from a trap to another trap cooled to $-80°$ C., with a slow flow rate of nitrogen as carrier gas gave 25 g. (60%) of (difluoroamino)sulfur pentafluoride ($SF_5NF_2$) of about 95% purity. A sample of pure $SF_5NF_2$ (99.5% purity) was obtained by preparative gas chromatography. A vapor pressure curve with an equation $$\log_{10} p = \frac{1195}{T} + 7.56$$

where $p$ is pressure in mm. and T is temperature in absolute degrees, was obtained from which the boiling point was calculated as $-17.5 \pm 0.5°$ C.

*Analysis.*—Calcd. for $SF_7N$: F, 74.30%; M.W., 179. Found: F, 74.34%; M.W., 180, 182 (by gas density).

The $F^{19}$ nuclear magnetic resonance spectrum at 56.4 mc./sec., using 1,2-difluorotetrachloroethane as a standard, is in agreement with the structure of this compound, $SF_5NF_2$, with a broad triplet centered at $-7428$ c.p.s. ($-NF_2$), which becomes a single on cooling to $-75°$ C., a quintuplet at $-6488$; $-6562$; $-6534$; $-6408$; and $-6300$ c.p.s., and a doublet at $-5900$ and $-5765$ c.p.s. ($-SF_5$).

*Example IV*

To an evacuated 200 cc. quartz tube there was added $SF_4$ (0.4 atm., 0.035 g., 0.0033 mole) and $N_2F_4$ (0.4 atm., 0.33 g., 0.0033 mole), and the tube was irradiated with a low-pressure mercury resonance lamp for 2.07 hours at 25° C. The products were condensed in a cylinder cooled at $-196°$ C., and analyzed by gas chromatography and infrared. The principal product was (difluoroamino)sulfur pentafluoride, $SF_5NF_2$ (30–35%). Smaller amounts of $SOF_4$, $SO_2F_2$, $SiF_4$, $N_2F_2$ (15%), $NF_3$, and unchanged $N_2F_4$ were also present.

(Difluoroamino)sulfur pentafluoride is useful as a polymerization initiator as shown by:

EXAMPLE A

A platinum tube was charged with 300 cc. of ethylene (0.37 g.) and 2 cc. of $SF_5NF_2$ (0.017 g.), the charged tube was then placed in an autoclave and pressured externally to 1000 atmospheres and heated to 150° C. These conditions were maintained for four hours. There was thus obtained 0.23 g. (62%) of solid ethylene polymer. Under similar conditions but in the complete absence of any catalyst, no solid ethylene polymer is obtained.

Since obvious modifications and equivalents in the invention will be evident to those skilled in the chemical arts, I propose to be bound solely by the appended claim.

I claim:

1. (Difluoroamino)sulfur pentafluoride having the formula $SF_5NF_2$.

References Cited

UNITED STATES PATENTS

| | | | |
|---|---|---|---|
| 2,736,694 | 2/1956 | Gunning et al. | 204—157 |
| 2,895,892 | 7/1959 | Chalkley | 204—157 |
| 2,928,720 | 3/1960 | Tullock | 23—14 |
| 3,000,694 | 9/1961 | Smith et al. | 23—14 |
| 3,228,936 | 1/1966 | Davis et al. | 260—553 X |
| 3,278,595 | 10/1966 | Sheehan et al. | 23—315 X |

OTHER REFERENCES

Logothetis et al., "Inorganic Chemistry," vol. 2, pp. 173–175 (1963).

Stump et al., "Inorganic Chemistry," vol. 2, pp. 648–649 (1963).

Attaway et al., "Journal of the American Chemical Society," vol. 81, pp. 3599–3603 (1959).

MILTON WEISSMAN, *Primary Examiner.*

HOWARD S. WILLIAMS, JOHN R. SPECK,
*Examiners.*